(12) United States Patent
Williams et al.

(10) Patent No.: US 6,488,517 B1
(45) Date of Patent: Dec. 3, 2002

(54) HIGH VOLTAGE ELECTRICAL CONNECTION FOR A DISPLAY SCREEN

(75) Inventors: Robert M. Williams, Chemlsford, MA (US); Richard H. Plourde, Jr., Westminster, MA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/146,869

(22) Filed: Sep. 3, 1998

(51) Int. Cl.[7] .................................................. H01R 3/00
(52) U.S. Cl. ........................ 439/165; 439/392; 439/31; 361/681; 364/708
(58) Field of Search ............................... 439/165, 932, 439/31; 361/681; 364/708

(56) References Cited

U.S. PATENT DOCUMENTS

| | | | |
|---|---|---|---|
| 3,643,007 A | * 2/1972 | Roberts et al. .............. | 174/106 |
| 4,174,463 A | * 11/1979 | Albert, Jr. ...................... | 174/79 |
| 4,959,887 A | * 10/1990 | Gruenberg et al. ........... | 16/223 |
| 5,690,501 A | * 11/1997 | Mader ......................... | 439/165 |
| 5,727,960 A | * 3/1998 | Zehrung ...................... | 439/165 |
| 5,751,544 A | * 5/1998 | Song .......................... | 361/681 |
| 5,952,791 A | * 9/1999 | Watanabe et al. ........... | 315/225 |
| 6,091,601 A | 7/2000 | Schlesener et al. ......... | 361/681 |

FOREIGN PATENT DOCUMENTS

JP            10240380        * 10/1998

* cited by examiner

Primary Examiner—P. Austin Bradley
Assistant Examiner—Truc Nguyen
(74) Attorney, Agent, or Firm—Fletcher, Yoder & Van Someren

(57) ABSTRACT

A high voltage electrical connection between a base unit and a panel display in a portable computer wherein the base unit and the panel display are pivotably secured to each other about a hinge axis, includes a flexible high voltage electrical conductor extending from the base unit to the panel display. A portion of the electrical conductor extends along the hinge axis such that pivoting of the panel display relative to the base unit causes said portion of the flexible conductor to twist about the hinge axis rather than actively bend.

18 Claims, 4 Drawing Sheets

HIGH VOLTAGE ELECTRICAL CONNECTION FOR A DISPLAY SCREEN

BACKGROUND

Most notebook computers include a base unit which houses the processor and keyboard of the computer. A top cover which houses a display screen is pivotably secured to the base unit. Low voltage signals for controlling the display screen are provided from the base unit to the display screen by a thin planar flex circuit extending therebetween. The portion of the planar surface of the flex circuit which crosses the hinge axis of the notebook computer actively bends when the top cover opens or closes. The flex circuit has a very thin cross section and is made of material flexible enough to allow the flex circuit to withstand tens of thousands of bending cycles without breaking.

The display screen is commonly backlit to improve viewing. The backlighting is typically powered by a high voltage inverter located within the top cover adjacent to the display screen. The high voltage inverter is enclosed within the top cover because the wires required for carrying high voltage power (about 1500 volts) have a much thicker cross section than a flex circuit making the high voltage wires less flexible and unable to withstand repeated bending cycles. Housing the inverter in the base unit would require the high voltage wires to extend across the hinge axis from the base unit to the display screen, subjecting the high voltage wires to breakage under the repeated bending and exposing the user to the possibility of 1500 volts of high voltage electrical shock.

A drawback of positioning the inverter in the top cover adjacent to the display screen is that the display screen must be smaller than the top cover by at least an amount equal to the width of the inverter. The display screen can be made larger, by locating the inverter behind the display screen. However, this would increase the thickness of the top cover in order to accommodate the inverter, and would in turn increase the overall thickness of the notebook computer.

SUMMARY OF THE INVENTION

The present invention is directed to a high voltage electrical connection between a base unit and a panel display in a portable computer wherein the base unit and the panel display are pivotably secured to each other about a hinge axis. The electrical connection includes a flexible high voltage electrical conductor extending from the base unit to the panel display. A portion of the electrical conductor extends along the hinge axis such that pivoting of the panel display relative to the base unit causes said portion of the flexible conductor to twist about the hinge axis rather than actively bend. Twisting a length of flexible conductor about its longitudinal axis exerts less stress on the flexible conductor than if the flexible conductor is repeatedly bent across its longitudinal axis.

In preferred embodiments, the flexible electrical conductor includes two insulated copper braided wires positioned longitudinally adjacent to each other. A sleeve surrounds a portion of the flexible conductor. The sleeve is made of a braided material capable of being shrink fitted over the flexible conductor and prevents wear of the flexible conductor due to twisting of the flexible conductor against components of the computer. Each wire preferably includes 19 twisted tinned annealed copper wire strands about 0.127 mm in diameter which are covered by a polymeric insulation jacket.

The present invention provides an electrical connection which allows the high voltage inverter of a notebook computer to be located in the base unit while at the same time, eliminating the possibility of conductor breakage and high voltage electrical shock to the user. As a result, the size of the display screen can be maximized without increasing the dimensions of the top cover.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
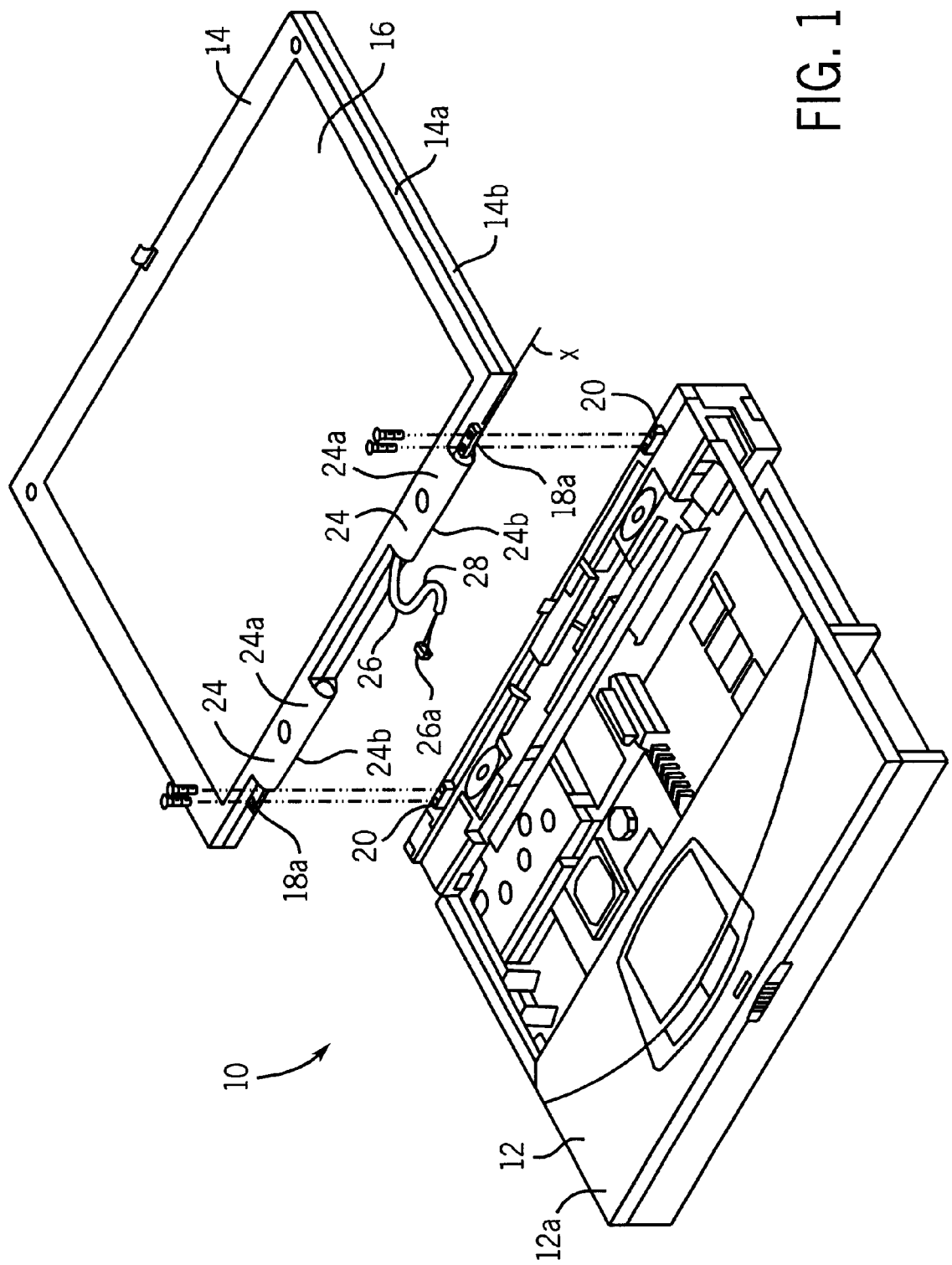
FIG. 1 is an exploded perspective view of a notebook computer including the present invention high voltage electrical connection with the keyboard and portions of the base unit housing removed.

Referring to FIGS. 1–4, notebook computer 10 includes a base unit 12 and a top cover 14 which are pivotably secured to each other by a pair of hinges 18 (FIG. 3) along a hinge axis X. The base unit 12 houses the keyboard (not shown), processor, drives etc. of the computer 10. The top cover 14 supports the panel display 16 of computer 10. Low voltage data signals to panel display 16 for controlling panel display 16 are provided by a conventional flex circuit extending between base unit 12 and top cover 14. High voltage power (about 1500 volts) from a high voltage inverter 56 (FIG. 2) within base unit 12 is provided to panel display 16 by the present invention high voltage connection which includes a flexible high voltage conductor 26 extending between inverter 56 and panel display 16. The high voltage power is used to backlight the panel display 16 using techniques in the art.

Figure 3:
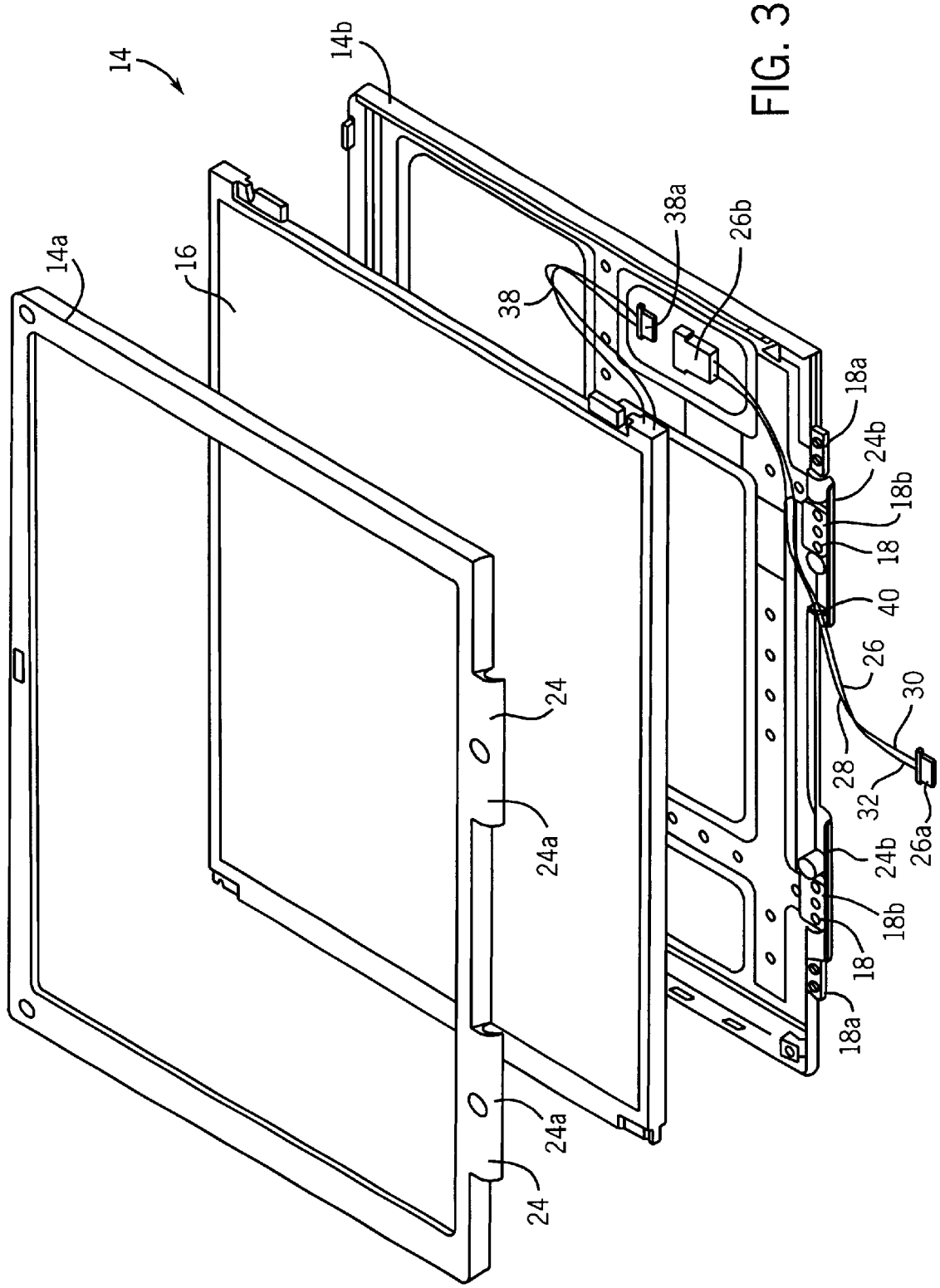
FIG. 3 is an exploded perspective view of the top cover of the notebook computer of FIG. 1, depicting the manner in which the high voltage electrical conductor is electrically connected to the display screen.

Top cover 14 includes an outer cover 14b which supports panel display 16 and an inner frame member 14a which secures panel display 16 to outer cover 14b (FIG. 3). Inner frame member 14a and outer cover 14b include two respective inner 24a and outer 24b hinge cover halves which when joined together, form two hinge covers 24. Two hinges 18 are spaced apart from each and enclosed within the interiors 44 (FIG. 4) of respective hinge covers 24. Each hinge 18 includes a hinge body 18b mounted to outer cover 14b and a hinge mount 18a which is pivotably secured to hinge body 18b (FIG. 3). Each hinge mount 18a extends from the outer axial end of a hinge cover 24 and is secured by screws to a base mount 20 at the rear of base unit 12, thereby pivotably securing top cover 14 to base unit 12 along hinge axis X (FIG. 1).

Figure 2:
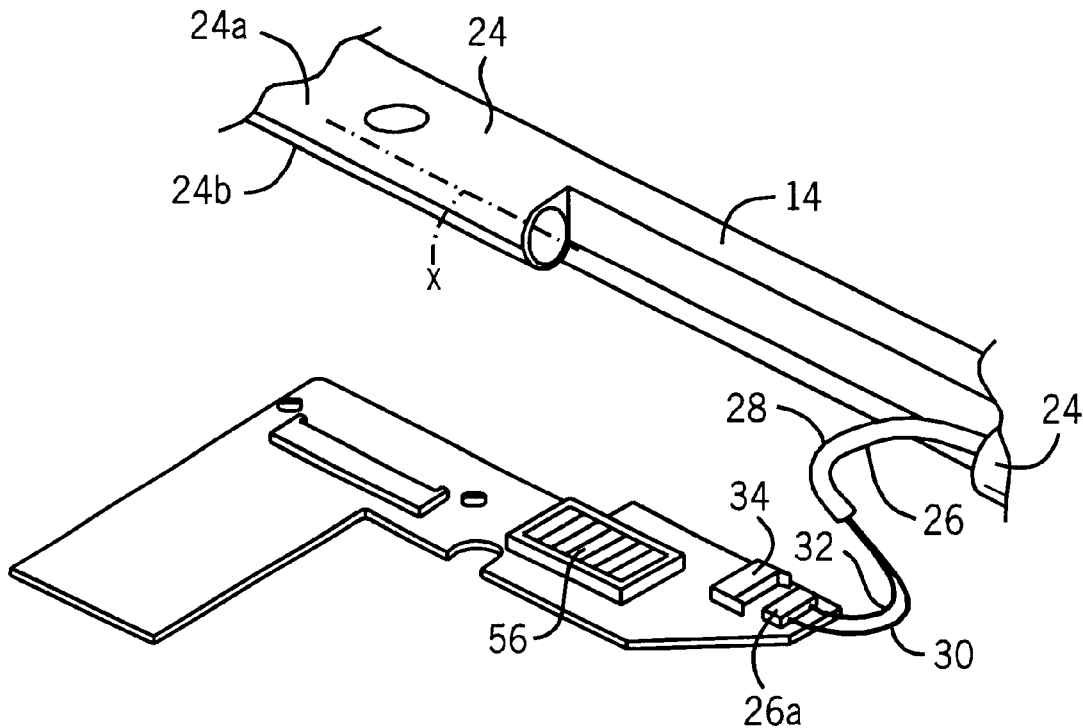
FIG. 2 is an enlarged perspective view depicting the manner in which the high voltage electrical conductor is electrically connected to the high voltage inverter in the base unit of the notebook computer of FIG. 1.
Figure 4:
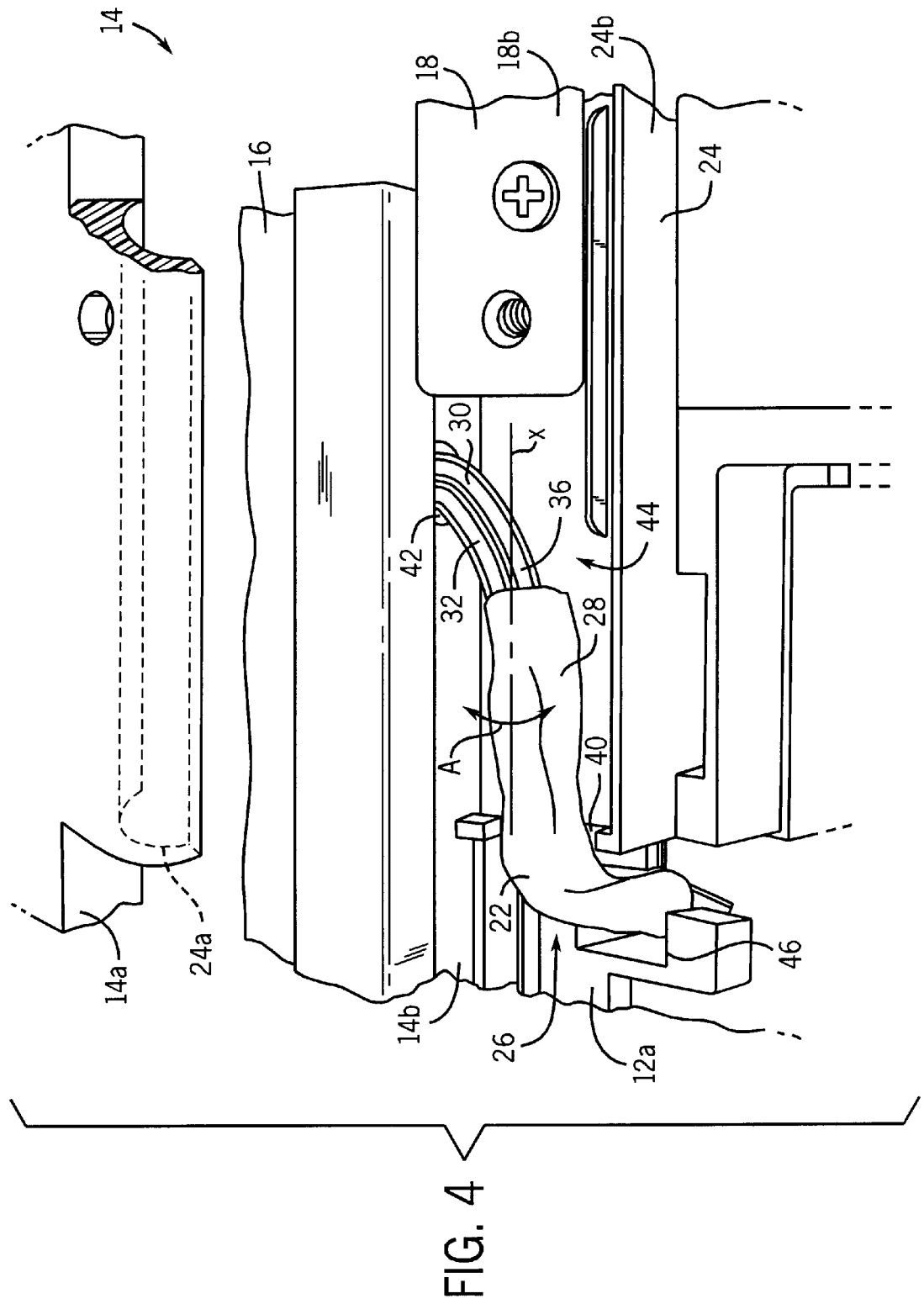
FIG. 4 is an enlarged perspective view of the present invention electrical conductor extending from the base unit to the top cover of the notebook computer of FIG. 1.

As shown in FIG. 2, high voltage conductor 26 includes two insulated braided wires 30 and 32 positioned side-by-side. A flexible braided sleeve 28, preferably about 1 inch wide, is shrink fitted over wires 32 and 30 on the portion of conductor 26 near base unit 12 (FIG. 4). If desired, a longer sleeve 28 can be employed. The lower end of wires 30/32 are electrically connected to a lower snap fit connector 26a which mates with inverter connector 34 (FIG. 2). The upper end of wires 30/32 are electrically connected to an upper snap fit connector 26b which mates with panel display connector 38a (FIG. 3). The snap fittings facilitate the assembly process. Conductor 26 extends upwardly from inverter connector 34 through an opening 46 in base unit housing 12a (FIG. 4). Conductor 26 is then bent at about 90° such that conductor 26 enters the right hinge cover 24 of top cover 14 through an opening 40 and lies within the interior 44 of hinge cover 24. The portion of conductor 26 wrapped in sleeve 28 (about one inch) extends from opening 46 in base unit housing 12a into opening 40 of hinge cover 24. The longitudinal axis of about a one inch length of conductor 26 lies approximately along the hinge axis X of notebook computer 10. Conductor 26 is then bent again at about 90° to exit the interior 44 of hinge cover 24 and enter an opening 42 within outer cover 14b below display screen 16 to couple with panel display connector 38a (FIG. 3). Panel display connector 38a is electrically connected to panel display 16 by wires 38.

Top cover 14 is typically rotated about the hinge axis X approximately 135° when opened or closed. Such a range of motion would normally fatigue and break prior art high voltage wires if such wires were extended between top cover 14 and base unit 12 in a perpendicular relation to hinge axis X. The reason for this is that the same area of the wires are repeatedly bent approximately 135° whenever the top cover 14 is opened and closed. Bending wires at the same area exerts alternating stresses to that area which fatigues and breaks the wires.

In contrast, in the present invention, by positioning a length of conductor 26 along the hinge axis X of notebook computer 10, no active bending of conductor 26 occurs. Although the portions of conductor 26 which enter and exit hinge cover 24 are initially bent at approximately right angles during assembly, no further bending occurs during use. The only cyclic or repeated movement of conductor 26 which occurs during use is that the length of conductor 26 longitudinally lying along hinge axis X twists back and forth approximately 135° about hinge axis X as indicated by the arrow "A" (FIG. 4) when top cover 14 is pivoted open or closed. The braided sleeve 28 prevents the insulation 48 (FIG. 5) of wires 30/32 from rubbing against hinge cover 24 and base unit housing 12a when conductor 26 twists, so that the insulation 48 does not wear off. The twisting of conductor 26 occurs along the length of conductor 26 between about points 22 and 36 (FIG. 4). This distributes the alternating stresses on conductor 26 over about a one inch length of conductor 26 instead of at a single spot. This is a large enough area to prevent the conductor 26 from fatiguing. In fact, conductor 26 has survived tests of 20,000 cycles of opening and closing top cover 14.

Figure 5:
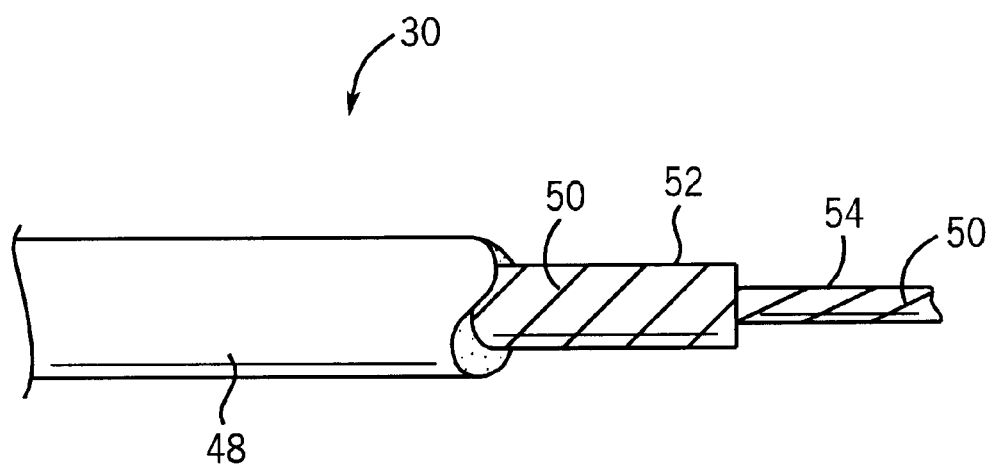
FIG. 5 is a side view of one wire of the high voltage electrical conductor of the computer of FIG. 1 with portions of the wire being removed.

The construction of wire 30 of conductor 26 is depicted in FIG. 5. Wire 32 (FIGS. 2–4) is similarly constructed. Wire 30 has an inner bundle 54 of seven wire strands 50 twisted around each other. The inner bundle 54 is surrounded by an outer series or bundle 52 of 12 wire strands 50 which are in turn twisted around inner bundle 54. An outer polymeric insulation covering 48 surrounds the outer series 52 of wire strands 50. The diameter of wire strands 50 is about 0.127 mm with the diameter of the entire conductor being about 0.64 mm. Wire strands 50 are preferably made of tinned annealed copper wire which has a temperature rating of about 105° C. Wire 30 has a voltage rating of about 3 KvDC and a maximum resistence of about 91.3 Ohm/Km at 20° C. Insulation 48 is preferably of double thickness and is about 0.48 mm thick with a diameter of about 1.6 mm +/−0.15 mm. Insulation 48 has a minimum resistance of about 1000 M Ohm/Km at 20° C. and a minimum tensile strength of about 1.06 Kg/mm². Although the preferred number and diameter of wire strands 50 has been described above, the number and diameter of the wire strands can be varied slightly while still providing desirable mechanical properties.

The length of conductor 26 is preferably about 5½ inches long but, alternatively, can be longer or shorter depending upon the location of inverter connector 34 or panel display connector 38a. In addition, connectors 26a/26b are preferably made of plastic but alternatively can be metallic. Although wires 30 and 32 are depicted to be separate wires, alternatively, wires 30 and 32 can be molded to be side by side.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

For example, connectors 26a, 26b, 34 and 38a can be omitted. In such a case, the wires 30/32 would be connected directly to inverter 56 and panel display 16.

What is claimed is:

1. A high voltage electrical connection between a base unit and a panel display in a portable computer, the base unit and the panel display being pivotably secured to each other about a hinge axis, the electrical connection comprising:
   a flexible high voltage electrical conductor extending from the base unit to the panel display, a portion of the electrical conductor extending along the hinge axis such that pivoting of the panel display relative to the base unit causes said portion of the flexible conductor to twist about the hinge axis rather than actively bend.

2. The electrical connection of claim 1 in which the flexible electrical conductor comprises a first insulated copper braided wire.

3. The electrical connection of claim 2 in which the flexible electrical conductor further comprises a second insulated copper braided wire positioned longitudinally adjacent to the first wire.

4. The electrical connection of claim 3 further comprising a sleeve surrounding a portion of the flexible conductor, said sleeve preventing wear of the flexible conductor due to twisting of the flexible conductor against components of the computer.

5. The electrical connection of claim 4 in which the sleeve comprises a braided material capable of being shrink fitted.

6. The electrical connection of claim 3 in which each wire includes 19 tinned annealed copper wire strands about 0.127 mm in diameter.

7. A system for providing high voltage power between a base unit and a panel display in a portable computer, the panel display being pivotable relative to the base unit about a hinge axis, the system comprising:

a high voltage power source housed within the base unit; and a flexible high voltage electrical conductor in electrical communication with the power source extending from the base unit to the display screen, a portion of the electrical conductor extending along the hinge axis such that pivoting of the panel display relative to the base unit causes said portion of the flexible conductor to twist about the hinge axis rather than actively bend.

8. The system of claim 7 in which the power source is a high voltage inverter which provides power for backlighting the display screen.

9. The system of claim 7 in which the flexible electrical conductor comprises a first insulated copper braided wire.

10. The system of claim 9 in which the flexible electrical conductor further comprises a second insulated copper braided wire positioned longitudinally adjacent to the first wire.

11. The system of claim 10 further comprising a sleeve surrounding a portion of the flexible conductor, said sleeve preventing wear of the flexible conductor due to twisting of the flexible conductor against components of the computer.

12. The system of claim 11 in which the sleeve comprises a braided material capable of being shrink fitted.

13. The system of claim 10 in which each wire includes 19 tinned annealed copper wire strands about 0.127 mm in diameter.

14. A method of forming a high voltage electrical connection between a base unit and a panel display in a portable computer, the base unit and the panel display being pivotably secured to each other about a hinge axis, the method comprising the steps of:

extending a high voltage flexible electrical conductor from the base unit to the panel display; and extending a portion of the electrical conductor along the hinge axis such that pivoting of the panel display relative to the base unit causes said portion of the flexible conductor to twist about the hinge axis rather than actively bend.

15. The method of claim 14 further comprising the step of forming the flexible electrical conductor from a first insulated copper braided wire.

16. The method of claim 15 further comprising the step of providing the flexible electrical conductor with a second insulated copper braided wire positioned longitudinally adjacent to the first wire.

17. The method of claim 16 further comprising the step of surrounding a portion of the flexible conductor with a sleeve, said sleeve preventing wear of the flexible conductor due to twisting of the flexible conductor against components of the computer.

18. The method of claim 16 further comprising the step of forming each wire from 19 tinned annealed copper wire strands about 0.127 mm in diameter.

* * * * *